United States Patent
Hausleitner

(10) Patent No.: US 10,693,573 B2
(45) Date of Patent: Jun. 23, 2020

(54) METHOD FOR LOCATING A TERRESTRIAL TRANSMITTING SOURCE OF AN UNKNOWN SIGNAL

(71) Applicant: Siemens Convergence Creators GmbH, Vienna (AT)

(72) Inventor: Christian Hausleitner, Zwettl (AT)

(73) Assignee: ATOS CONVERGENCE CREATORS GMBH, Vienna (AT)

(*) Notice: Subject to any disclaimer, the term of this patent is extended or adjusted under 35 U.S.C. 154(b) by 402 days.

(21) Appl. No.: 15/288,574

(22) Filed: Oct. 7, 2016

(65) Prior Publication Data

US 2017/0111131 A1 Apr. 20, 2017

(30) Foreign Application Priority Data

Oct. 14, 2015 (EP) .................................... 15189773

(51) Int. Cl.
| | | |
|---|---|---|
| *H04B 17/327* | (2015.01) | |
| *G01S 5/02* | (2010.01) | |
| *H04K 3/00* | (2006.01) | |
| *H04B 17/40* | (2015.01) | |
| *H04B 15/00* | (2006.01) | |
| *G01S 11/06* | (2006.01) | |
| *H04B 7/185* | (2006.01) | |

(52) U.S. Cl.
CPC .............. *H04B 17/327* (2015.01); *G01S 5/02* (2013.01); *G01S 5/0273* (2013.01); *H04B 15/00* (2013.01); *H04B 17/40* (2015.01); *H04K 3/22* (2013.01); *H04K 3/255* (2013.01); *G01S 11/06* (2013.01); *H04B 7/1851* (2013.01)

(58) Field of Classification Search
None
See application file for complete search history.

(56) References Cited

U.S. PATENT DOCUMENTS

| | | | |
|---|---|---|---|
| 5,008,679 | A | 4/1991 | Effland et al. |
| 5,457,466 | A | 10/1995 | Rose |
| 5,572,220 | A | 11/1996 | Cai |
| 5,594,452 | A * | 1/1997 | Webber .................. G01S 1/026 342/174 |
| 6,583,755 | B2 | 6/2003 | Martinerie et al. |
| 7,436,359 | B1 | 10/2008 | Rose |
| 8,077,088 | B2 | 12/2011 | Rose |
| 8,081,111 | B2 * | 12/2011 | Haworth .................. G01S 5/06 342/357.4 |

(Continued)

FOREIGN PATENT DOCUMENTS

| | | |
|---|---|---|
| EP | 0 649 033 A3 | 7/1996 |
| EP | 2 735 883 A1 | 5/2014 |

(Continued)

*Primary Examiner* — Sujoy K Kundu
*Assistant Examiner* — Terence E Stifter, Jr.
(74) *Attorney, Agent, or Firm* — Cozen O'Connor

(57) ABSTRACT

A method for locating a terrestrial transmitting source of an unknown signal that is transmitted via satellite to a terrestrial receiver, wherein the method includes comparing a power fluctuation of the unknown signal with a power fluctuation of at least one known signal allocated to a terrestrial transmitting source and determining a degree of similarity between the power fluctuation of the unknown signal and the power fluctuation of the at least one known signal.

9 Claims, 3 Drawing Sheets

(56) References Cited

U.S. PATENT DOCUMENTS

| | | | |
|---|---|---|---|
| 2003/0117319 A1* | 6/2003 | Rideout | G01S 5/06 342/453 |
| 2008/0252516 A1 | 10/2008 | Ho et al. | |
| 2010/0097267 A1 | 4/2010 | Ho et al. | |
| 2010/0201570 A1* | 8/2010 | Shemar | G01S 5/10 342/357.59 |
| 2013/0210449 A1* | 8/2013 | Flanagan | G01S 5/0252 455/456.1 |
| 2014/0266881 A1 | 9/2014 | Le Pera et al. | |
| 2014/0327571 A1* | 11/2014 | Westcott | G01S 5/02 342/351 |
| 2014/0378177 A1* | 12/2014 | Muraoka | H04W 16/14 455/501 |
| 2015/0035699 A1* | 2/2015 | Yun | G01S 5/0036 342/357.29 |

FOREIGN PATENT DOCUMENTS

| | | |
|---|---|---|
| EP | 2 784 534 A1 | 10/2014 |
| WO | WO 97/11383 A1 | 3/1997 |
| WO | WO 01/014902 A1 | 3/2001 |
| WO | WO 2008/053173 A1 | 5/2008 |
| WO | WO 2008/128081 A1 | 10/2008 |
| WO | WO 2008/156905 A9 | 12/2008 |
| WO | WO 2009/040500 A1 | 4/2009 |

\* cited by examiner

METHOD FOR LOCATING A TERRESTRIAL TRANSMITTING SOURCE OF AN UNKNOWN SIGNAL

BACKGROUND OF THE INVENTION

1. Field of the Invention

The invention relates to a method for locating a terrestrial transmitting source of an unknown signal that is transmitted via satellite to a terrestrial receiver.

2. Description of the Related Art

Radio Frequency Interference (RFI) is a significant problem for both satellite end users and satellite operators. End users suffer from degraded performance (up to a total loss of service) and satellite operators being responsible for maintaining the quality of service are losing revenue. Therefore, geolocating a source of interference is an important task for resolving satellite interference problems. Several hundreds of interference events are recorded per year and this number is likely to grow with the increase of traffic and unattended earth stations.

It has become known from EP2784534A1 to apply frequency measurements of signals received from a single satellite. These measurements are taken at different times for use in determining the transmit location of an unknown emitter position taking into account variations in frequency due to Doppler effects.

Another approach known, for instance, from US 20140266881A1 works with crosstalk measurements between signals received from multiple antennas/beams belonging to the same satellite. The individual antenna together with the crosstalk measurement between each antenna are used for calculating lines of position (LOP) on the surface of the earth representing the plurality of possible interferer locations. The intersection of two or more LOPs results in the location of the interferer's position.

U.S. Pat. Nos. 7,436,359B1, 8,077,088B2, 5,457,466A, 5,572,220A and 5,608,411A relate to methods using multiple antennas or phased array antennas to determine the direction vector to a transmitter position (angle of arrival) which, when intersected with the surface of the earth, gives the location of the emitter position. Such techniques are based on phase measurements between the individual antenna signals to find the angle of arrival or direction vector towards the emitter position.

A modification of the above method works with multiple antennas to find the electrical field vector used for de-riving a perpendicular plane which is intersected with the surface of the earth for LOP calculating (see U.S. Pat. No. 6,583, 755B2). Other systems are based on time difference of arrival and/or frequency difference on arrival measurements of signals transmit via two or more satellites to be received at one or several earth stations (see EP2735883A1, US20100097267, WO2008128081A1, WO2008156905A9, WO2008053173A1, WO2001014902, WO1997011383A1, U.S. Pat. Nos. 5,008,679A, 5,594,452A1, and EP649033A3).

However, each conventional method has the disadvantage that in practice most of the constraints (such as precise knowledge of ephemeris data, availability of adjacent satellite with the same uplink frequency range and overlapping uplink beam, or sufficient energy crosstalk) are not applicable.

SUMMARY OF THE INVENTION

In view of the foregoing, it is therefore an object of the invention to provide a method for geolocating the source of an unknown radio frequency satellite interference signal (unknown signal) with high reliability.

This and other objects and advantages are achieved in accordance with the invention by a method comprising the steps of comparing a power fluctuation of an unknown signal with a power fluctuation of at least one known signal allocated to a terrestrial transmitting source, and determining a degree of similarity between the power fluctuation of the unknown signal and the power fluctuation of the at least one known signal.

One benefit of the invention is to enable identification of an unknown RFI transmitters based only on power fluctuation measurements. Therefore, the invention overcomes the constraints of the above-described conventional methods. Even in cases in which the transmit position of signals with high power fluctuation similarity to the interferer is not known, the result can be used for resolving the interference case by contacting the satellite provider's customer accounting department in order to get in touch with the customer who potentially causes the interference.

The degree of similarity between the power fluctuations of the unknown signal and the at least one known signal can be used as a measure for the distance between the terrestrial transmitting source of the unknown signal and the terrestrial transmitting source of the at least one known signal.

In order to capture high rate power fluctuations between data of the unknown signal and the known signal, the signals are acquired simultaneously.

A measurement speed may be increased in that data of the unknown signal and the known signal are acquired continuously.

The terrestrial transmitting source of an unknown signal and the at least one known signal allocated to a terrestrial transmitting source are received by a receiver located in a satellite instead of a terrestrial receiver.

Sensitivity of the measurement may be increased in that downlink path influences, such as a power fluctuation of a beacon signal, a transponder noise floor and/or an average power fluctuation of the unknown signal and the known signal, are subtracted from the unknown signal and the at least one known signal.

In accordance with an embodiment of the invention, the subtraction of downlink path influences takes into account the frequency dependency of atmospheric influences and/or dependency of the polarization of signals transmit through the atmosphere.

Accuracy may be further increased, if signals that suffer from power fluctuations introduced by hardware of a respective ending transmitting source, are excluded, if the average power fluctuation is calculated and subtracted from the unknown signal and the at least one known signal.

In accordance with a preferred embodiment of the invention, several known signals, each allocated to a different terrestrial transmitting source, are received and the power fluctuation of the unknown signal is compared to a power fluctuation of each of the known signals. Here, the location of the terrestrial transmitting source of the unknown signal is estimated based on the positions of the terrestrial transmitting sources of the known signals having the highest degree of similarity with the unknown signal in terms of power fluctuation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and further advantages thereof are described in more detail in the following with reference to several non-restricting exemplary embodiments, which are shown in the drawings, in which.

DETAILED DESCRIPTION OF THE EXEMPLARY EMBODIMENTS

Figure 1:
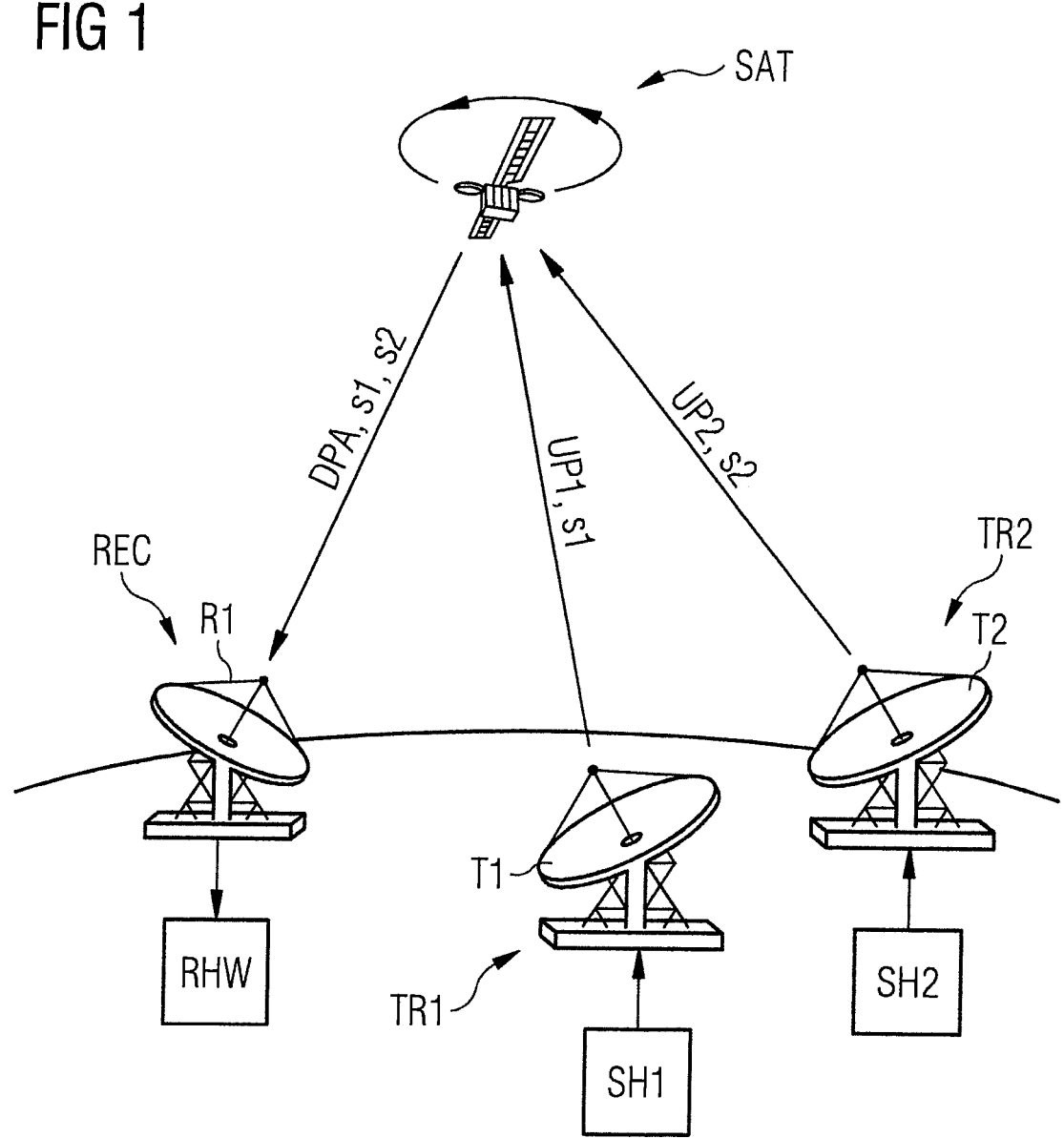
FIG. 1 shows schematic block diagram of a satellite system with a radio frequency interference transmitter of an unknown position.

Initially, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as top, bottom, or side, relate to the currently described and represented figure and in case of a change in position should be adjusted to the new position.

With reference to FIG. 1, a known signal s1 generated by a known transmitter TR1 is sent via an uplink path UP1 to a satellite SAT. The signal s1 is then transmitted via a downlink path DPA to a receiver REC. In the present context, "known" means that the terrestrial location of the transmitter is known, whereas "unknown" means that the terrestrial location of the transmitter is not known. An unknown transmitter TR2 generates an unknown signal s2 which may interfere with other signals transmit via the satellite (interfering signal). The signal s2 is transmitted via uplink path UP2 to the satellite SAT and via downlink path DPA to the receiver REC.

The power of the unknown signal s2 received by the receiver REC is measured versus time and the resulting power fluctuation is compared with power measurements of other/known signals s1 transmitted via the same or other satellites SAT to the receiver REC. From this comparison, a measure of similarity between the signals s1 and s2 is calculated which serves for estimating the location of the unknown transmitter (interferer) TR2 in terms of calculating distance information between the interferer location and known transmitter locations based on the degree of similarity of power fluctuations.

It should be noted that the unknown signal s2 of the unknown transmitter TR2 and the at least one known signal s1 allocated to the terrestrial transmitting source TR1 can also be received by a receiver located in a satellite SAT instead of a terrestrial receiver REC.

Figure 2:
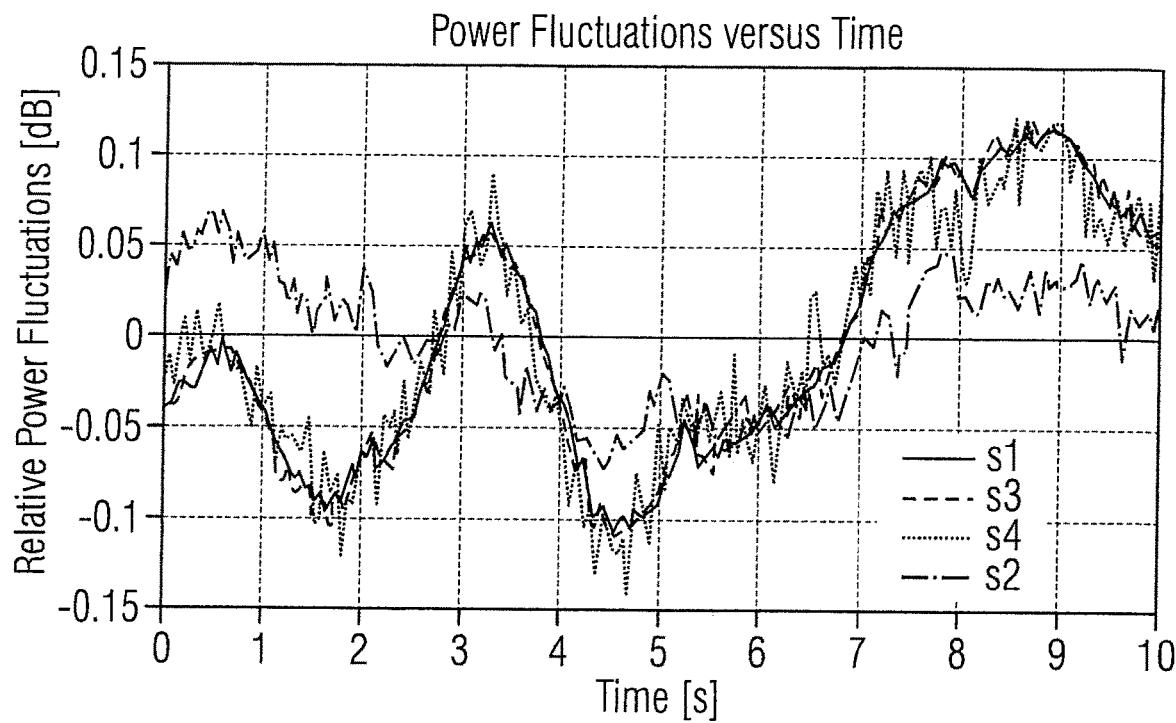
FIG. 2 shows graphical plots of power fluctuations versus time of received signals.

FIG. 2 shows an exemplary graphical plot of power fluctuation measurements of signals received with the same antenna R1 while the signals s1, and s3 are transmitted from the same antenna T1. The signals s1 and s4 are sent from different antennas located at the same earth station TR1 and the signal s2 is sent from a different uplink earth station TR2 than the signal s1.

In case signals s1, s3 are transmitted via the same antenna T1 and received via the same antenna R1, the signal power fluctuations versus time of these signals s1, s3 are very similar because they have similar uplink path UP1 and downlink path DPA influences due to the same path through the atmosphere (similar impact form the atmosphere) and the same hardware applied (e.g., antenna alignment, sending hardware SH1, or receiving hardware RHW). On the other hand, if the transmitting stations TR1, TR2 are far away from each other, then the power fluctuation components associated with the uplink path UP1, UP2 are different and what results is reduced similarity between the received signals s1, s2 in terms of power fluctuations versus time.

Similarity between the signals s1 and the signals s2, s3, s4 of FIG. 2:

| Signal | Similarity with signals s1 |
| --- | --- |
| s1 | 100% |
| s2 | 48.7% |
| s3 | 99.5% |
| s4 | 94.9% |

The higher the geographical distance between two earth stations TR1, TR2 respectively the antennas T1, T2, the smaller is the common influence from the atmosphere associated with the uplink paths UP1, UP2. Therefore, the signal s4 is transmit from a transmit station that is much closer located to TR1 than the transmit station of signal s2.

In order to determine the similarity of power fluctuations, the similarity of power fluctuations may be presented graphically together with measures of similarity (e.g., correlation, or distance functions) which allow estimation of the geographical distance between the location of the unknown transmitter position and other known signal transmitters.

To determine a distance between the unknown transmitter TR2 and the known transmitter TR1, a cross-correlation function of the known signal s1 and the unknown signal s2 could be calculated, where a maximum of the function corresponds to a delay time of the two signals caused by the different uplink paths UP1 and UP2 and the propagation delay of atmospheric influences between the transmitter positions. Given the speed of the signals that correspond to the speed of light (between transmitter position and satellite) and the velocity of propagation of atmospheric influences, the distance between the different uplink paths of transmitter TR1 and TR2 is the product of the signal speed and the delay time subtracted by the propagation delay of atmospheric influences between TR1 and TR2 position.

The similarity measure, respectively, the geographic distance between the unknown interferer TR2 position and signals s1 belonging to the known transmit positions, can be used to narrow the geolocation result in terms of using intersecting lines of position that correspond to constant distances from known transmitter TR1 positions. For example, in case of three signals each belonging to a transmitter of known position having almost the same measure of similarity with regard to the unknown (interferer) signal s2, the unknown transmitter position is geographically in the center of the three known transmitters.

The localization results can be enhanced with respect to compensating similarities introduced by the common downlink path (atmospheric influences, antenna alignment of receiving antenna R1, receiver-hardware RHW). For this purpose, measurements are taken into account (subtracted) that are mainly affected by power fluctuations introduced by the downlink path, such as (i) beacon power fluctuation measurements versus time, because the beacon signal is generated by the satellite SAT, (ii) transponder noise floor power fluctuation measurements versus time. The major part of this noise is accumulated from the surface of the earth covering an uplink beam area that can be considered as sum of statistically independent contributions of noise power affected by atmospheric influences that are also statistically independent due to the geo-graphical spreading over the whole beam coverage. Therefore, the accumulated noise power fluctuations associated with the uplink path are negligible. In addition, (iii) the average power fluctuation of signals transmitted from different uplink earth stations is another factor. In this case, it is assumed that power fluctuations associated with the uplink path (atmosphere, antenna T1, T2, transmitter hardware SH1, SH2) are statistically independent. Similar to transponder noise power measurements, the contributions of the uplink path become more and more negligible the higher the number of data that are taken into account when calculating the average power fluctuations versus time. In order to minimize power fluctuations introduced by the sending hardware signals with statistical parameters (e.g., fluctuation rate and magnitude), different from those expected from the atmospheric influence are excluded from the averaging process.

Figure 3:
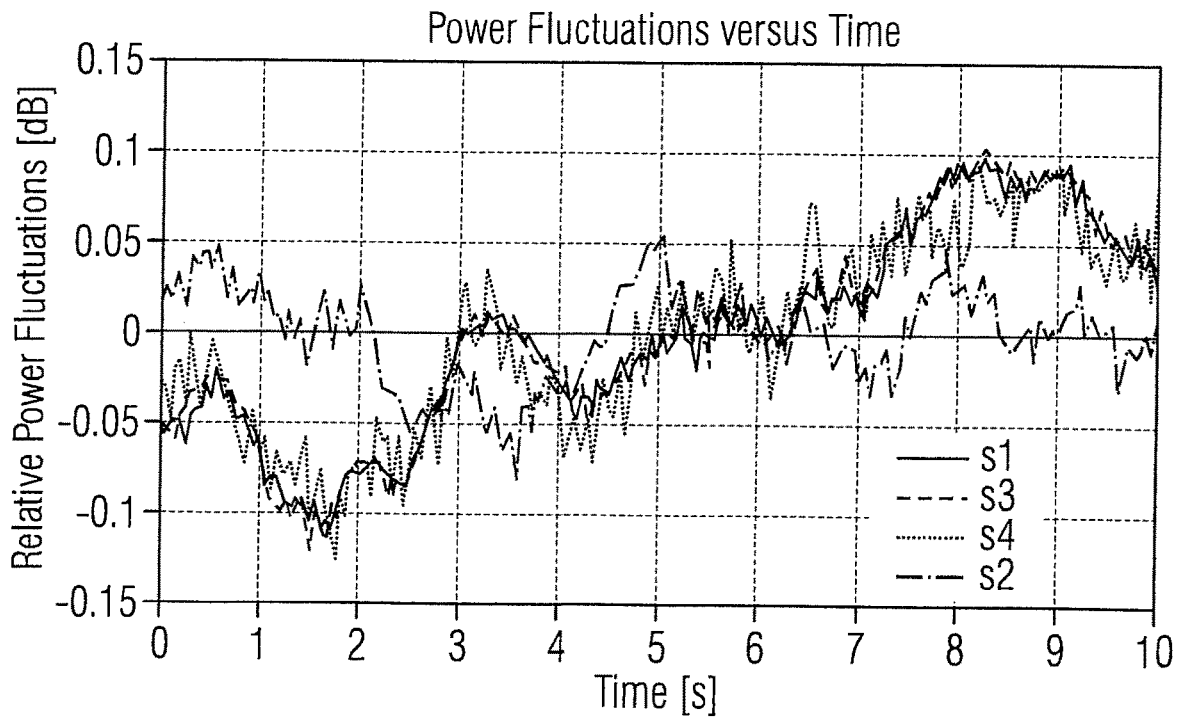
FIG. 3 shows a graphical plot of the signals of FIG. 2, where average power fluctuations of signals transmitted from different uplink earth stations are subtracted.

FIG. 3 shows a graphical plot of power fluctuation measurements of the same signals as indicated in FIG. 2 but enhanced by virtue of having subtracted average power fluctuations of signals transmitted from different uplink earth stations to compensate for power fluctuations associated with the downlink path DPA. Here, it is evident the sensitivity of the system is increased with respect to lowering the similarity for signals transmitted from positions far away.

Similarity between the signals s1 and the signals s2, s3, s4 with subtraction of average power fluctuation:

| | |
|---|---|
| s1 | 100% |
| s2 | 11.2% |
| s3 | 99.2% |
| s4 | 92.6% |

Signals s1, s2 transmitted via satellite SAT to the receiver REC are subjected to several influences causing power fluctuations:

(i) Power variations from signal sending-receiving hardware SH1, SH2, RHW (satellite modem, frequency converter, or power amplifier);

(ii) Satellite movement versus antenna pattern and pointing mechanism (e.g., antenna tracking the satellite position or constant bearing towards the satellite, antenna pointing fluctuations due to wind);

(iii) Absorption due to the gases in the atmosphere;

(iv) Atmospheric losses due to scattering, scintillation and depolarization caused by hydrometers (e.g., rain, or snow) in the troposphere;

(v) Faraday rotation in the ionosphere;

(vi) Noise contributions (e.g., terrestrial noise picked up from the surface of the earth, receiver noise in both satellite and Rx ground station, atmospheric noise, or extra-terrestrial noise from the sun and moon); and/or (vii) Satellite transponder automatic gain control (AGC) mechanism frequently applied to compensate for degradation due to atmospheric losses in the uplink path UP1, UP2.

Some of the above mentioned influences cause power fluctuation rates that are considered slow (minutes to hours), while other propagation effects introduce power fluctuations of significantly higher rates (seconds and below). With this information, the reasons of different power fluctuations can be isolated and used for further enhancing the localization result. The following influences, for example, cause different rates and magnitudes of power fluctuations:

(i) Antenna alignment effects frequently show slow power changes versus times with repetitions every 24 hours due to the movement of the satellite versus antenna pattern. Sometimes small power jumps can be seen that are caused by antenna movements in cases of an applied tracking mechanism. In case such fluctuations are also present in another signal, this is an indication that both signals are transmitted by the same antenna T1, T2;

(ii) Bad weather conditions may cause strong drops of the signal power within minutes to hours. In general signals with similar power fluctuations can be regarded to be transmitted within the same geographical area which is affected by the local weather pattern; and/or (iii) Atmospheric scintillation effects causing small (<0.5 dB) but high rate power fluctuations.

Figure 4:
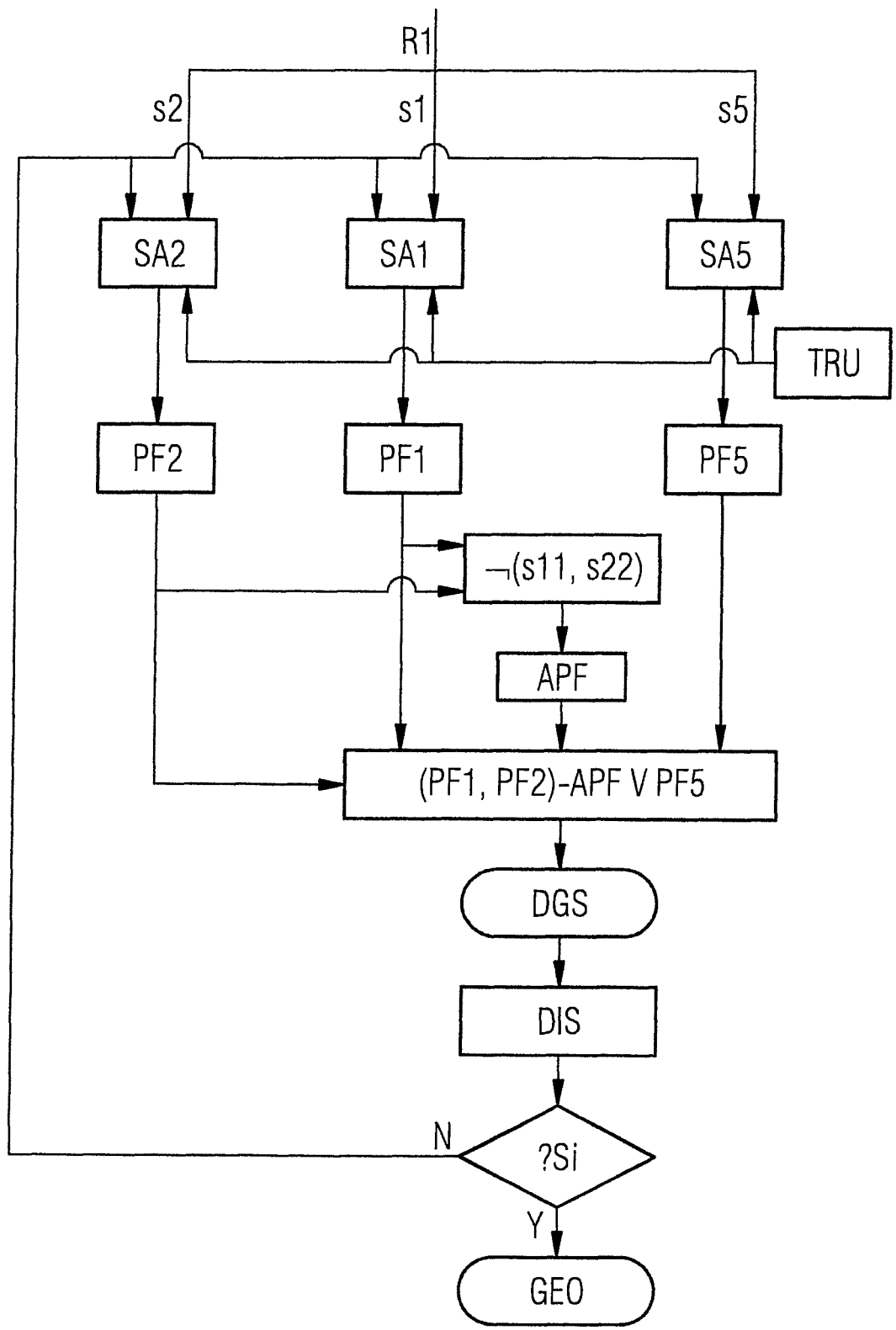
FIG. 4 shows a flow chart of the method in accordance with the invention.

For catching high rate power fluctuation similarities, it is important that the individual measurements of the signals s1, s2 are performed close in time to each other or even simultaneously. Therefore, in accordance with FIG. 4 several signal acquisition devices SA1, SA2, SA5 can be used to acquire the signals s1, s2 and s5. In this case, the signal acquisition devices SA1, SA2, SA5 have to be repeatedly triggered at the same time (from the same trigger unit TRU) until a sufficient number of measurements have, been collected. It should be noted signal s5 corresponds to a beacon or transponder noise signal.

Furthermore, the signals s1, s2, s5 can also be acquired continuously over a certain period of time (continuous data acquisition). This approach has the advantage of higher measurement speed (no gap between the measurements), and high rate power fluctuations are not missed.

In case all potential satellite signals (interferer and known signals) cannot be acquired simultaneously (e.g. due to bandwidth limitations), the measurements can be performed consecutively in terms of acquiring all signals that fit into the bandwidth supported by the equipment together with acquiring the interfering signal s2, transponder noise power and beacon signal simultaneously with other measurement devices.

After acquisition of the signals s1, s2, s5, the power fluctuations PF1, PF2, PF5 of the respective signals s1, s2, s5 are measured. Signals s11, s22 suffering from power fluctuations introduced by the sending hardware SH1, SH2 may then be excluded, and an average power fluctuation APF may be calculated.

The beacon or transponder noise power fluctuation PF5 or the average power fluctuation APF may then be subtracted from the measured power fluctuations PF1, PF2. After that the degree of similarity DGS between the resulting power fluctuations corresponding to signals s1 and s2 is determined.

Based on the degree of similarity DGS the distance DIS between the unknown transmitter TR2 and the known transmitter TR1 may be calculated. If all signals si needed for the calculation have been acquired geolocation GEO of the interferer uplink position can occur. If all signals si that are needed have not been acquired, then the measurement is repeated until all signals si are measured.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for locating a terrestrial transmitting source of a signal which is transmitted from an unknown location of the terrestrial transmitting source via satellite to a terrestrial receiver to resolve satellite interference problems, the method comprising:
    acquiring data of the signal transmitted from the unknown location of the terrestrial transmitting source and at least one known signal;
    comparing a power fluctuation of the signal transmitted from the unknown location of the terrestrial transmitting source with a power fluctuation of the at least one known signal allocated to a known terrestrial transmitting source;
    determining a degree of similarity between the power fluctuation of the signal transmitted from the unknown location of the terrestrial transmitting source and the power fluctuation of the at least one known signal;
    calculating an estimate of a distance between the terrestrial transmitting source of the signal and the terrestrial transmitting source of the at least one known signal based on the degree of similarity between the power fluctuations of the signal transmitted from the unknown location of the terrestrial transmitting source and the at least one known signal; and
    estimating the location of the terrestrial transmitting source of the signal based on positions of the terrestrial transmitting source of the at least one known signal having a highest degree of similarity between the power fluctuations of the signal and the at least one known signal to resolve the satellite interference problems.

2. The method according to claim 1, wherein data of the signal transmitted from the unknown location of the terrestrial transmitting source and the known signal are acquired simultaneously.

3. The method according to claim 1, wherein the signal and the at least one known signal allocated to a terrestrial transmitting source are received by a receiver located in a satellite instead of a terrestrial receiver.

4. The method according to claim 1, wherein downlink path influences are subtracted from the signal transmitted from the unknown location of the terrestrial transmitting source and the at least one known signal.

5. The method according to claim 4, wherein the subtraction of downlink path influences takes into account a frequency dependency of atmospheric influences.

6. The method according to claim 4, wherein the subtraction of downlink path influences takes into account dependency of atmospherically transmitted polarization signals.

7. The method according to claim 4, wherein the downlink path influences comprise at least one of a power fluctuation of a beacon signal, a transponder noise floor and an average power fluctuation of the unknown signal and the known signal.

8. The method according to claim 1, wherein signals, which suffer from power fluctuations introduced by hardware of a respective sending transmitting source, are excluded, if the average power fluctuation is calculated and subtracted from the signal transmitted from the unknown location of the terrestrial transmitting source and the at least one known signal.

9. The method according to claim 1, wherein a plurality of known signals each allocated to a terrestrial transmitting source are received and the power fluctuation of the signal transmitted from the unknown location is compared to a power fluctuation of each of the plurality of known signals.

* * * * *